United States Patent
Sjöö et al.

(10) Patent No.: US 9,095,916 B2
(45) Date of Patent: Aug. 4, 2015

(54) MILLING TOOL FOR GEAR MILLING

(75) Inventors: Strure Sjöö, Gävle (SE); Mats Wennmo, Hässleholm (SE)

(73) Assignee: Sandvik Intellectual Property AB, Sandviken (SE)

( * ) Notice: Subject to any disclaimer, the term of this patent is extended or adjusted under 35 U.S.C. 154(b) by 493 days.

(21) Appl. No.: 13/359,561

(22) Filed: Jan. 27, 2012

(65) Prior Publication Data

US 2012/0207553 A1    Aug. 16, 2012

(30) Foreign Application Priority Data

Feb. 11, 2011  (SE) ........................................ 1150111

(51) Int. Cl.
*B23F 1/06* (2006.01)
*B23F 21/16* (2006.01)

(52) U.S. Cl.
CPC .................. *B23F 21/166* (2013.01); *B23F 1/06* (2013.01); *Y10T 407/1725* (2015.01)

(58) Field of Classification Search
CPC ............... B23C 2200/0405; B23C 2200/0433; B23C 2200/0411; B23C 2200/165; B23F 1/06; B23F 21/16; B23F 21/163; B23F 21/166; B23F 21/262; B23F 21/264
USPC ......... 407/25, 23, 15, 17, 19, 27, 42, 61, 113, 407/114, 26, 59, 58
See application file for complete search history.

(56) References Cited

U.S. PATENT DOCUMENTS

| | | | | |
|---|---|---|---|---|
| 2,615,359 A * | 10/1952 | Cook | ................ | 82/19 |
| 2,698,477 A * | 1/1955 | Jarno | ............... | 407/26 |
| 3,688,368 A * | 9/1972 | Bodem | ........................ | 407/25 |
| 3,766,618 A * | 10/1973 | Janninck | ........................ | 407/26 |
| 3,892,022 A * | 7/1975 | Johnson | ........................ | 407/26 |

(Continued)

FOREIGN PATENT DOCUMENTS

| | | |
|---|---|---|
| DE | 1652801 A1 * | 4/1971 |
| EP | 2 072 162 | 6/2009 |
| JP | 2001-353621 | 12/2001 |

OTHER PUBLICATIONS

Office Action (with English translation) for Chinese Application No. 201210030532, dated Feb. 27, 2015.

*Primary Examiner* — Daniel Howell
*Assistant Examiner* — Alan Snyder
(74) *Attorney, Agent, or Firm* — Morgan, Lewis & Bockius LLP (57) ABSTRACT

Milling tool has a tool body with a fixing end, an opposite outer end, and a peripheral surface. The tool body comprises a large number of separated seats arranged at the peripheral surface one after the other along a helix line having a constant pitch. Corresponding large number of replaceable milling inserts comprise an under side, an opposite upper side forming a chip surface, a circumferential edge side, and two pairs of main cutting edges. The chip surface extends in an extension plane that comprises the main cutting edges. Each seat receives one of the milling inserts and comprises a support surface allowing support to the milling insert projecting from the tool body for cutting engagement with a gash of the workpiece. The chip surface extension plane of each milling insert has a normal parallel to the tangent of the helix line where the same intersects the extension plane.

18 Claims, 8 Drawing Sheets

(56) References Cited

U.S. PATENT DOCUMENTS

| | | |
|---|---|---|
| 4,218,159 A | 8/1980 | Langen |
| 4,572,042 A | 2/1986 | Wiman |
| 5,593,254 A | 1/1997 | Peters |
| 5,921,721 A | 7/1999 | Hintze et al. |
| 6,669,412 B1 | 12/2003 | Hirose et al. |
| 6,684,752 B2 | 2/2004 | Satran et al. |
| 7,387,474 B2 * | 6/2008 | Edler et al. .................... 407/113 |
| 7,476,063 B2 * | 1/2009 | Wickman et al. ............. 407/113 |
| 7,537,419 B2 | 5/2009 | Sjöberg et al. |
| 7,544,023 B2 | 6/2009 | Löf et al. |
| 7,758,287 B2 | 7/2010 | Alm et al. |
| 2010/0215446 A1 | 8/2010 | Wandebäck |
| 2012/0207555 A1 | 8/2012 | SjÖÖ et al. |

* cited by examiner

MILLING TOOL FOR GEAR MILLING

RELATED APPLICATION DATA

This application is based on and claims priority under 37 U.S.C. §119 to Swedish Application No. 1150111-1, filed Feb. 11, 2011, the entire contents of which are incorporated herein by reference.

FIELD OF THE DISCLOSURE

The present disclosure relates to a milling tool for gear milling and more precisely for so-called hobbing. More particularly, the present disclosure relates to a milling tool formed for the hobbing of a workpiece having cogs, such as gear wheels, racks and the like.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Milling tools are provided for the gear milling of gear wheels in different modules Mn depending on the size of the gear wheels to be manufactured. There are modules from Mn=1 for very small gear wheels, to Mn=22 or more for very great gear wheels. The disclosed tool can be used for gear wheels of all modules but is particularly suitable for the milling of gear wheels with Mn=3 to Mn=8.

U.S. Pat. No. 5,593,254 shows a milling tool formed for the hobbing of workpieces having cogs, such as gear wheels, racks and the like. The milling tool comprises a tool body that defines a rotation axis and should have a fixing end, an opposite outer end, and a peripheral surface that extends around the rotation axis between the fixing end and the outer end. The tool body comprises a large number of seats that are arranged one after the other. In each seat, a milling insert is arranged. The milling insert has an upper side that forms a chip surface, an under side and two opposite, converging main cutting edges. The main cutting edges are connected by a front transverse end cutting edge. The milling insert is fastened by a screw that extends through an eccentric hole of the milling insert from the upper side to the under side. The milling insert has a ridge on the under side that is in engagement with a groove in the seat. The upper side of the milling insert forms a chip surface that leans in relation to a radial plane in respect of the rotation axis. This causes an error of the involute of the cogs that are to be milled.

EP-A-2 072 162 shows a milling tool formed for the hobbing of a workpiece having cogs, such as gear wheels, racks and the like. The milling tool comprises a tool body that defines a rotation axis and has a fixing end, an opposite outer end, and a peripheral surface that extends around the rotation axis between the fixing end and the outer end. Furthermore, the tool body comprises a number of seats that are arranged at the peripheral surface one after the other along a helix line having a constant pitch. The milling tool also comprises a corresponding number of milling inserts. Each seat is formed with a support surface that supports a milling insert projecting from the tool body. Each milling insert comprises a row of three teeth. Each tooth is formed for engagement with a gash of the workpiece. Each milling insert has an upper side that forms a chip surface for each tooth. The chip surfaces of the three teeth are lying in a common plane, which means that a normal of the chip surface will form an acute angle with a tangent of the helix line where this intersects the chip surface at least for two ones of the teeth.

JP-A-2001-353621 shows an additional example of a milling tool for hobbing. The milling inserts are formed with a row of teeth. The individual teeth of the milling tool are arranged along a helix line. Each tooth is formed for engagement with a gash of the workpiece. The milling inserts have an upper side that forms a chip surface having a normal that forms an acute angle with the tangent of the helix line. As in the milling tool that is shown in U.S. Pat. No. 5,593,254, the chip surfaces lean in relation to a radial plane in respect of the rotation axis.

U.S. Pat. No. 5,593,254, EP-A-2 072 162 and JP-A-2001-353621 as well as the present disclosure relate to a milling tool wherein the seats of the milling inserts extend essentially radially. There are also milling tools for hobbing wherein the seats of the milling inserts extend essentially tangentially. An example of such a tool having tangential seats is shown in U.S. Pat. No. 4,218,159. This type of milling tool has the disadvantage that it requires at least twice as many milling inserts, two for each gash. By milling tools having radial seats, each milling insert can be formed with a pair of main cutting edges that simultaneously are in engagement with both cogs that surround a gash.

SUMMARY

The object of the present invention is to provide a milling tool for gear milling, which has a high accuracy in the cutting machining of cogs. Furthermore, a cutting tool is desired that allows gear cutting in an economically favourable way.

Said object is achieved by the milling cutter body that is indicated by way of introduction and characterized in that the chip surface extension plane of each milling insert has a normal that is parallel to the tangent of the helix line where the same intersects the extension plane.

Thanks to each milling insert being formed for engagement with only one gash of the workpiece, it is possible to position each milling insert in an optimal way in respect of the cutting machining and the tolerance level being aimed at for the cogs that are to be milled. Such a high tolerance level is obtained by a chip surface that extends in a plane having a normal parallel to the tangent of the helix line. The involute of the cogs can obtain the desired shape. Because each milling insert is replaceable, the tool body obtains a very long service life without the need of maintenance. Only the milling inserts need to be replaced when they are worn.

According to one exemplary embodiment, the distance between adjacent milling inserts along the helix line is equal for each pair of adjacent milling inserts. Also, such a positioning of the milling inserts contributes to a high accuracy in the manufacture of cogs and that the involute of the cogs can obtain the desired shape.

According to an additional exemplary embodiment, the milling inserts are arranged in a plurality of rows and each row comprising at least two milling inserts and extending along a respective line that is perpendicular to the tangent of the helix line. In an advantageous way, the chip surface extension planes of adjacent pairs of milling inserts of the same row may form an angle, or a constant angle, with each other for each pair of milling inserts. Differently expressed, the extension plane for each chip surface will lie in a unique plane, at least for each milling insert of each such row, but in practice also for all milling inserts of the tool.

According to an additional exemplary embodiment, the tool body comprises elongate recesses in the peripheral surface, which extend parallel to and border on a respective one of said rows in such a way that each recess forms a chip-receiving space at the chip surface of the milling inserts of such a row.

According to an additional exemplary embodiment, the chip surface extension plane forms an acute angle with the edge side at least in the vicinity of the main cutting edges so that the milling insert obtains a positive cutting geometry.

According to an additional exemplary embodiment, each seat comprises a pocket that extends inward from the peripheral surface. Such a pocket is advantageous and may serve as a protection for the part of the milling insert that is not in engagement with the workpiece.

According to an additional exemplary embodiment, each seat comprises a protuberance that projects from the peripheral surface. Such a protuberance extends the support surface outward from the tool body and thereby the support surface can provide an improved support to the milling insert during the machining.

According to an additional exemplary embodiment, each pocket is limited by the support surface and an inner limiting wall formed in such a way that there is a gap between the limiting wall and the milling insert. Thereby, the milling insert does not rest against the rear limiting wall. Thanks to this gap, a freer design of the milling insert and the cutting edges thereof is made possible. Thus, the flexibility of use of the milling tool can be improved since it becomes possible to mount milling inserts of different design, for instance protuberance inserts, milling inserts for cogs having top edge involute, high profile, etc. Indexable milling inserts also become possible since the part of the milling insert that faces inward does not rest against the inner limiting wall and can accordingly be provided with cutting edges.

According to an additional exemplary embodiment, the support surface of each seat comprises a projection that extends from the support surface and that is in engagement with a corresponding recess of the under side of the milling insert in such a way that the position of the milling insert is guaranteed. Such a projection and recess guarantees that the milling insert cannot move parallel to the support surface. Advantageously, the projection may comprise a first elongate ridge having a primarily radial extension in respect of the rotation axis, and a second elongate ridge having a primarily axial extension in respect of the rotation axis. The first elongate ridge prevents the movement of the milling insert parallel to the rotation axis, and the second elongate ridge prevents the movement of the milling insert perpendicular to the rotation axis. The first elongate ridge engages a corresponding first elongate valley of the milling insert, and the second elongate ridge engages a corresponding second elongate valley of the milling insert. The two ridges of the support surface may be manufactured by milling in the tool body, for instance by means of a long edge moulder and an end mill.

According to an additional exemplary embodiment, the milling insert comprises a, preferably central, fastening hole that extends through the upper side and the under side, the milling insert being fastened in the seat by means of a fixing screw that extends through the fastening hole into a threaded hole extending through the support surface.

According to an additional exemplary embodiment, the under side of the milling insert extends in an extension plane parallel to the extension plane of the upper side.

According to an additional exemplary embodiment, the symmetry line forms a pressure angle $\alpha$ with each one of the main cutting edges of said pairs of main cutting edges, the pressure angle $\alpha$ being in the interval of 18-32°. According to a first variant, the pressure angle $\alpha$ may be, for instance, 20°. According to a second variant, the pressure angle $\alpha$ may be, for instance, 30°.

According to an additional exemplary embodiment, each milling insert comprises at least one transverse end cutting edge that extends between the main cutting edges of said pairs of main cutting edges. The end cutting edge may be straight or comprise a straight segment having transition edges of a small radius of curvature to the respective main cutting edge.

According to an additional exemplary embodiment, each milling insert is indexable by rotation around the centre axis between two opposite insert positions and comprises two of said pairs of main cutting edges, one for each insert position.

According to an additional exemplary embodiment, the pocket forms a protection for the pair of main cutting edges that faces inward toward the rotation axis. This is advantageous since the pocket can prevent wear or other damage to the non-active main cutting edges.

According to an additional exemplary embodiment, the upper side of the milling insert has a rhombic basic shape with a relatively long diagonal line and a relatively short diagonal line perpendicular to the relatively long diagonal line. The relatively long diagonal line may coincide with the symmetry line.

An exemplary embodiment of milling tool formed for the hobbing of a workpiece having cogs comprises a tool body that defines a rotation axis (x) and has a fixing end, an opposite outer end, and a peripheral surface that extends around the rotation axis (C1) between the fixing end and the outer end, the tool body comprising a large number of separated seats that are arranged at the peripheral surface one after the other along a helix line (x) having a constant pitch, and a corresponding plurality of replaceable milling inserts each one of which comprises an under side, an opposite upper side that forms a chip surface, a circumferential edge side that connects the upper side and the under side, a centre axis (A) that extends through the under side and the upper side, a symmetry line (S) that is perpendicular to the centre axis (A), as well as at least one pair of main cutting edges that are symmetrical in respect of the symmetry line (S) and formed where the edge side meets the chip surface, the chip surface extending in an extension plane (p) that comprises the main cutting edges of said pairs of main cutting edges, and each seat being formed to receive one of said milling inserts and comprising a support surface that is arranged to allow support to the milling insert that projects from the tool body for cutting engagement with a gash of said workpiece (W), wherein the chip surface extension plane (p) of each milling insert has a normal that is parallel to the tangent of the helix line (x) where the same intersects the extension plane.

Milling tools for gear milling are provided in different tolerance classes according to the German standard DIN. The finest class is AAA. Then the classes AA, A, B, C, D follow. The tolerance classes A and B are required for the manufacture of gear wheels for gearboxes for motor vehicles. For the milling tool according to the present disclosure, at least tolerance class B is aimed at.

BRIEF DESCRIPTION OF THE DRAWINGS

The following detailed description of preferred embodiments can be read in connection with the accompanying drawings in which like numerals designate like elements and in which.

DETAILED DESCRIPTION

FIGS. 1-9 show an embodiment of a milling tool formed for gear cutting and more precisely for so-called the hobbing of a workpiece W having cogs. The milling tool is suitable for the cutting machining of different workpieces W, such as gear wheels, racks, splines, impellers for hydraulic pumps, and similar cogged elements.

The milling tool comprises a tool body 1 and a large number of replaceable milling inserts 2. The milling inserts 2 are manufactured from a harder material than the tool body 1, for instance cemented carbide. The tool body 1 may be manufactured from steel.

The tool body 1 defines a rotation axis C1 and has a fixing end 3 and an opposite outer end 4. The rotation axis C1 extends through the fixing end 3 and the outer end 4. At the fixing end 3, there is a fastening pin 5, see FIG. 5, for the fixing of the tool body 1 and the milling tool in a tool spindle S1 of a milling cutter or multioperation machine. The tool body 1 is rotatable around the rotation axis C1 in a direction of rotation R1 (clockwise rotation to the right as viewed from within the tool spindle S1).

The workpiece W is fixed in a workpiece spindle S3 and is rotatable around a rotation axis C3 in a direction of rotation R3. In the embodiments shown, the workpiece W rotates clockwise to the right as viewed from outside.

Figure 4:
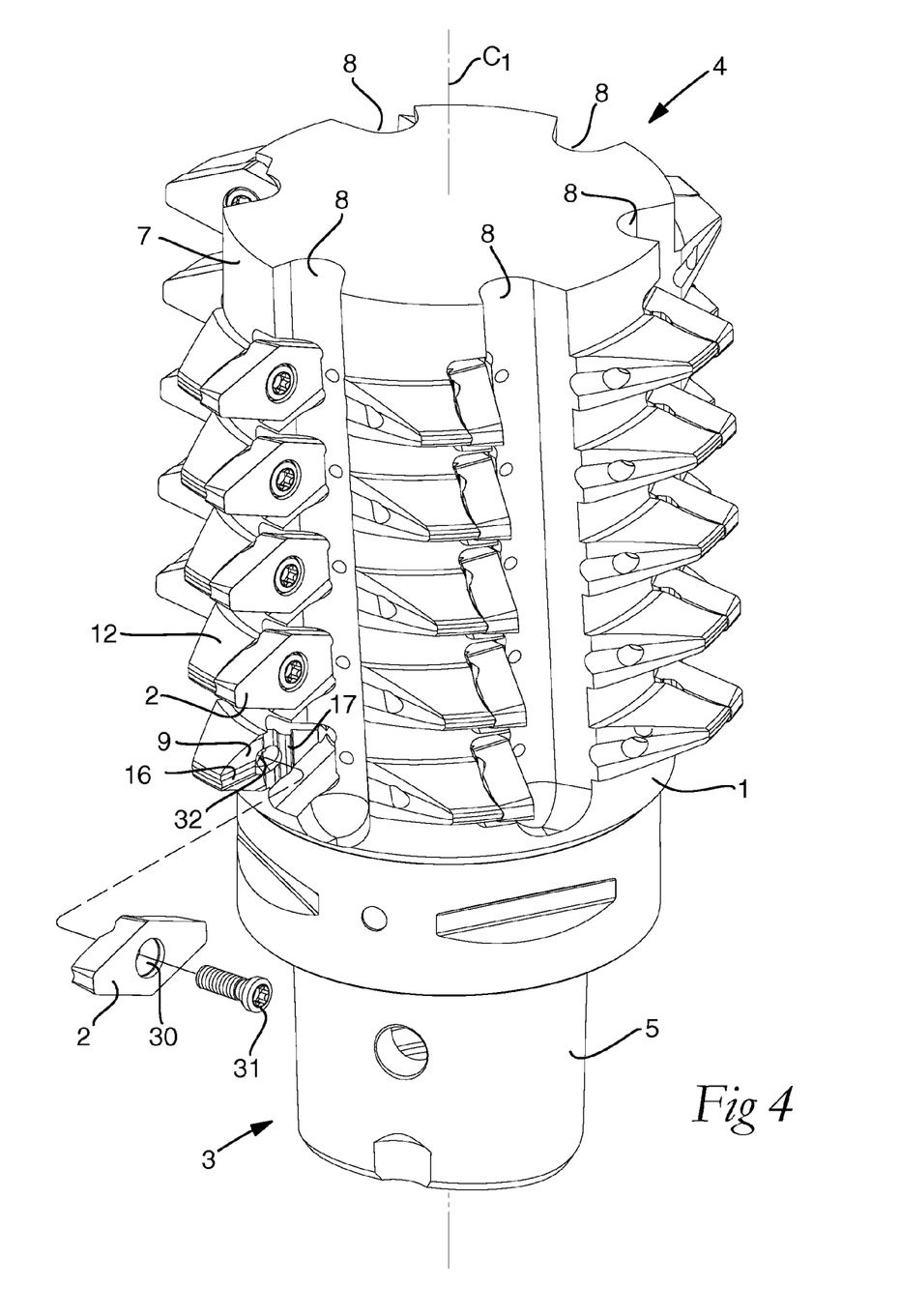
FIG. 4 schematically shows a perspective view of the milling tool in FIG. 1 on a greater scale.
Figure 5:
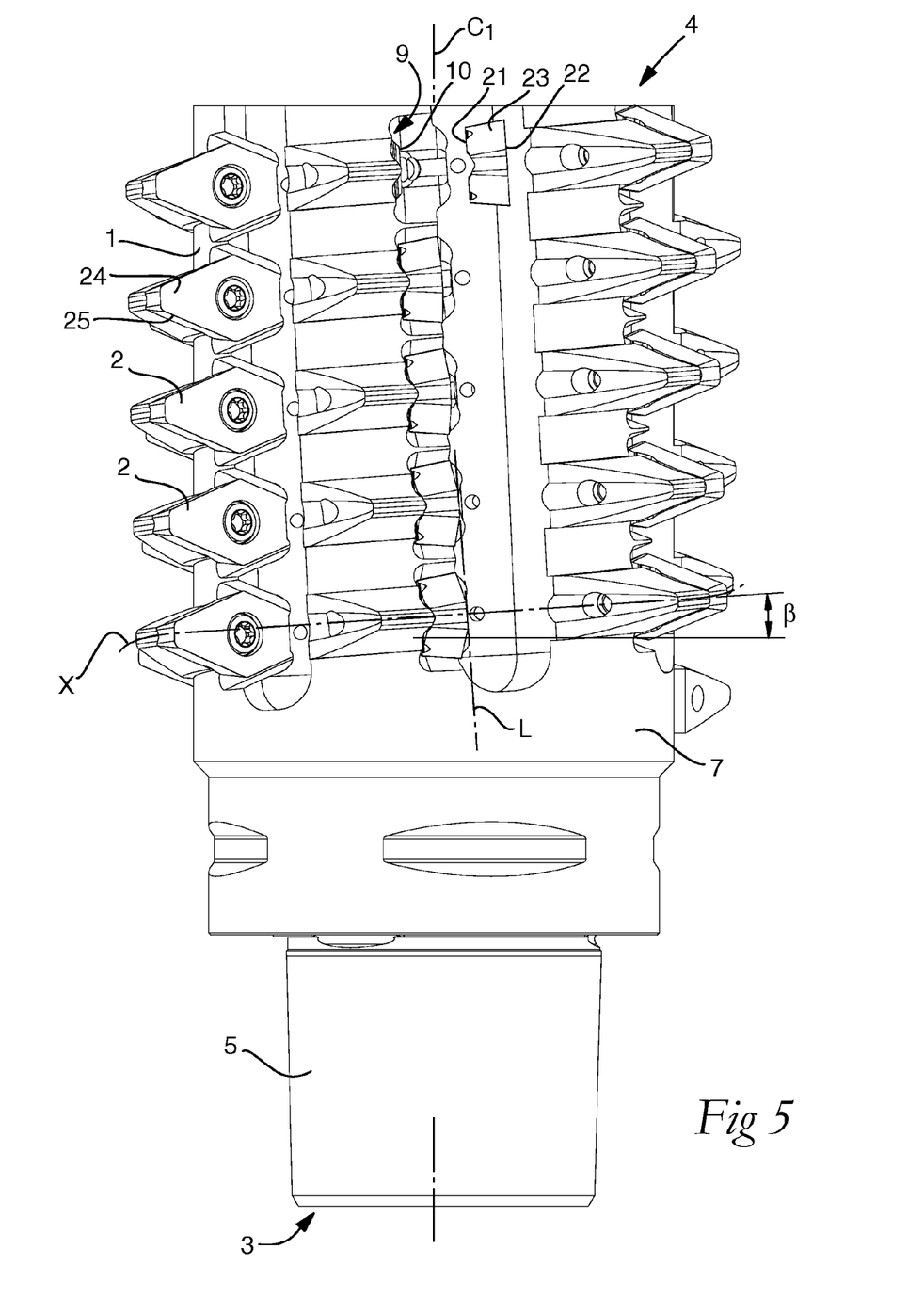
FIG. 5 schematically shows a side view of the milling tool in FIG. 1 on a greater scale.

The tool body 1 has a peripheral surface 7 that extends around the rotation axis C1 between the fixing end 3 and the outer end 4, and more precisely from the outer end 4 up to the fastening pin 5, see FIGS. 4 and 5. The tool body 1 comprises a plurality of elongate recesses 8 in the peripheral surface 7. In the embodiment illustrated, the milling tool comprises 6 such recesses 8. However, it should be noted that the milling tool may comprise another number of recesses 8, for instance 4, 5, 7 or 8 recesses 8.

The tool body 1 also comprises a large number of separated seats 9, see in particular FIGS. 4-7, which are arranged at the peripheral surface 7. Each seat 9 is formed to receive one of the milling inserts 2. The seats 9, and the milling inserts 2, are arranged one after the other along a helix line x having a constant pitch, see FIG. 5. In the embodiments shown, the pitch direction of the helix line x is to the right. The pitch direction may also be to the left depending on the cog to be manufactured. The pitch angle β may be 1-10°.

Each seat 9 comprises a support surface 10 that is arranged to allow or form a support to the milling insert 2. Each seat 9 also comprises a pocket 11 that extends inward from the peripheral surface 7, and a protuberance 12 that projects from the peripheral surface 7. A part of the support surface 10 is formed of the protuberance 12. When the milling insert 2 is mounted in the seat 9, it projects from the tool body 1 past the protuberance 12 for cutting engagement with a gash of the workpiece W, see FIGS. 1-3.

Figure 7:
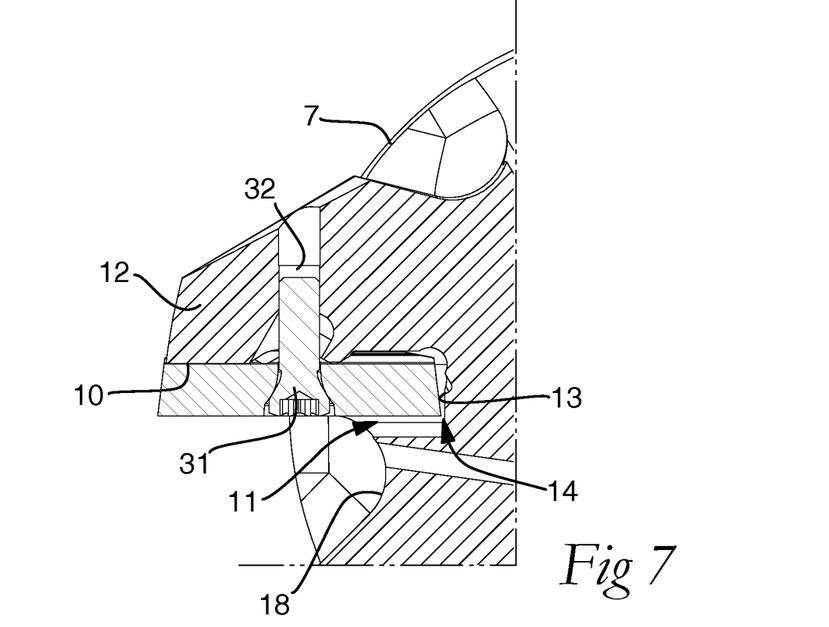
FIG. 7 shows a section view along the line VII-VII in FIG. 5.

Each pocket 11 is limited by the support surface 10 and an inner limiting wall 13 formed in such a way that there is a gap 14 between the limiting wall 13 and the milling insert 2 when the milling insert 2 is mounted in the seat 9, see FIG. 7.

The support surface 10 of each seat 9 comprises a projection that extends from the support surface 10. The projection comprises a first elongate ridge 16 having a primarily radial extension, and a second elongate ridge 17 having a primarily axial extension. The first elongate ridge 16 intersects the second elongate ridge 17 at a right, or essentially right, angle. Each elongate ridge 16, 17 has an upper surface 18 that is essentially flat and parallel to the support surface 10, and two flank surfaces 19 that connect the upper surface 18 to the support surface 10. The two flank surfaces 19 form an obtuse angle with each other. This angle may be 90-140°, for instance 120°.

Each milling insert 2, see FIGS. 10-13, comprises an under side 21, an opposite upper side 22, and a circumferential edge side 23 that connects the upper side 22 and the under side 21. The upper side 22 forms a chip surface 24 that extends in an extension plane p. Also the under side 21 of the milling insert 2 extends in an extension plane parallel to the extension plane of the upper side 22 or chip surface 24. The first variant of the milling insert 2, shown in FIGS. 10-13, has an upper side 22 that entirely coincides with the extension plane p and with the chip surface 24, which accordingly is entirely flat.

In the embodiments shown and the different variants in FIGS. 10-17, each milling insert 2 comprises two pairs of main cutting edges 25, a first pair of main cutting edges 25 and a second pair of main cutting edges 25, which are formed where the edge side 23 meets the chip surface 24. Thus, each milling insert 2 comprises four main cutting edges 25 distributed in two pairs of main cutting edges 25. Thus, the milling insert 2 is formed so that it can be in engagement with only one gash when the milling insert 2 is mounted in the milling tool, see further below.

The chip surface 24 extends in the above mentioned extension plane p that comprises the main cutting edges 25 of said pairs of main cutting edges 25. A centre axis A extends through the under side 21 and the upper side 22. A symmetry line S is perpendicular to the centre axis A and extends parallel to the extension plane p. The two main cutting edges 25 of the first pair of main cutting edges 25 are converging and symmetrically placed in respect of the symmetry line S. The two main cutting edges 25 of the second pair of main cutting edges 25 are and also converging and symmetrically placed in respect of the symmetry line S. Thus, each milling insert 2 is indexable by rotation around the centre axis A between two opposite insert positions. In a first insert position, the first pair of main cutting edges 25 projects from the milling tool, and in a second insert position, the second pair of main cutting edges 25 projects from the milling tool.

The under side 21 of the milling insert 2 has a recess that extends from the under side 21. The recess comprises a first elongate valley 26 and two second elongate valleys 27, one for each insert position. The first elongate valley 26 extends parallel to the symmetry line S and has a primarily radial extension when the milling insert 2 is mounted in the milling tool. The second elongate valleys 27 intersect the first elongate valley 26 at a right, or essentially right, angle and have a primarily axial extension when the milling insert 2 is mounted in the milling tool.

Each elongate valley 26 and 27 comprises a bottom surface 28 and two flank surfaces 29. The flank surfaces 29 connect the bottom surface 28 to the under side 21. These surfaces 28, 29 co-operate with the upper surface 18 and the flank surfaces 19 when the milling insert 2 is mounted in the seat 9. The flank surfaces 29 form an obtuse angle with each other. This angle is identical with or equal to the obtuse angle between the flank surfaces 19.

Thus, the first elongate valley 26 is formed to be in engagement with the corresponding first elongate ridge 16 of the support surface 10. The second elongate valleys 27 are formed to be in engagement with the second elongate ridge 17 of the support surface 10. Thus, when the milling insert 2 is mounted in the seat 9, the first elongate ridge 17 and the first elongate valley 26 are in engagement with each other. The second elongate ridge 17 is in engagement with one of the second elongate valleys 27. Thereby, the flank surfaces 19 are abutting against the flank surfaces 29. There may be a gap between the upper surface 18 and the bottom surface 28.

Each milling insert 2 comprises a fastening hole 30 that extends parallel to the centre axis A through the upper side 22 and the under side 21. In the embodiments shown, the centre axis A also forms a centre axis of the fastening hole 30. The milling insert 2 is fastened in the seat 9 against the support surface 10 by means of a fixing screw 31 that extends through the fastening hole 30 into a threaded hole 32 extending through the support surface 10. The hole 32 is located radially outside the second elongate ridge 17 and extends through the first elongate ridge 16, see FIG. 4.

The upper side 22 of the indexable milling insert 2 has a rhombic basic shape with a relatively long diagonal line coinciding with the symmetry line S, and a relatively short diagonal line being perpendicular to the relatively long diagonal line and the symmetry line S. The symmetry line S forms a pressure angle $\alpha$ with each one of the main cutting edges 25 of each pair of main cutting edges 25, see FIG. 13. The pressure angle $\alpha$ is in the interval of 18-32°. In the embodiments shown, the pressure angle $\alpha$ is equal to, or essentially equal to, 20°. In another embodiment, the pressure angle $\alpha$ may be equal to, or essentially equal to, 30°. The size of the pressure angle $\alpha$ is depending on the cog to be manufactured.

Each milling insert 2 also comprises two transverse end cutting edges 33 that extend between the main cutting edges 25 of the respective pair of main cutting edges 25. Each end cutting edge 33 may be straight, or comprise a straight segment that is perpendicular, or essentially perpendicular, to the symmetry line S. Thus, the two end cutting edges 33, or their straight segments, are parallel to each other, or essentially parallel to each other. Between this straight segment and the main cutting edges 25, there may be transition edges of a small radius of curvature. The two main cutting edges of the first pair converge toward a point outside the end cutting edge 33 that borders on said main cutting edges 25. Thus, this point is lying at a greater distance from the end cutting edge 33 than from the centre axis A. The two main cutting edges of the second pair converge toward a point outside the end cutting edge 33 that borders on said main cutting edges 25. Thus, this point is lying at a greater distance from the end cutting edge 33 than from the centre axis A.

Figure 6:
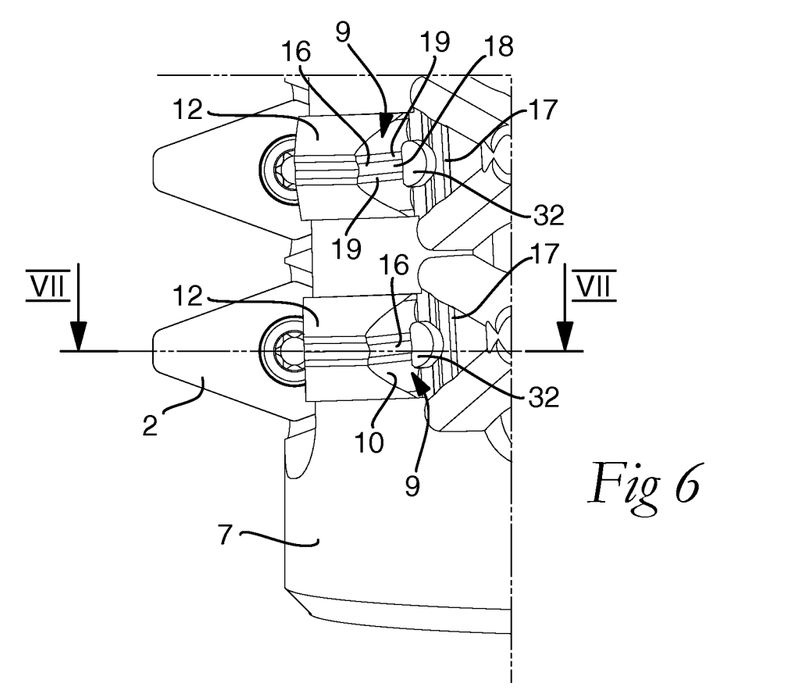
FIG. 6 shows a side view of a part of the milling tool in FIG. 1.

As is seen in FIGS. 4-6, the above mentioned pocket 11 forms a protection for the pair of main cutting edges 25 that faces inward toward the rotation axis C1, and for the end cutting edge 33 that connects these two main cutting edges 25.

The seats 9, and accordingly also the milling inserts 2, are arranged in a plurality of rows. In the embodiments shown, the milling tool 6 comprises such rows of milling inserts 2. However, it should be noted that the milling tool may comprise another number of rows of milling inserts 2, for instance 4, 5, 7 or 8 rows. Each row comprises at least two milling inserts 2, and seats 9. In the embodiments shown, each row 5 comprises milling inserts 2 and seats 9.

Figure 1:
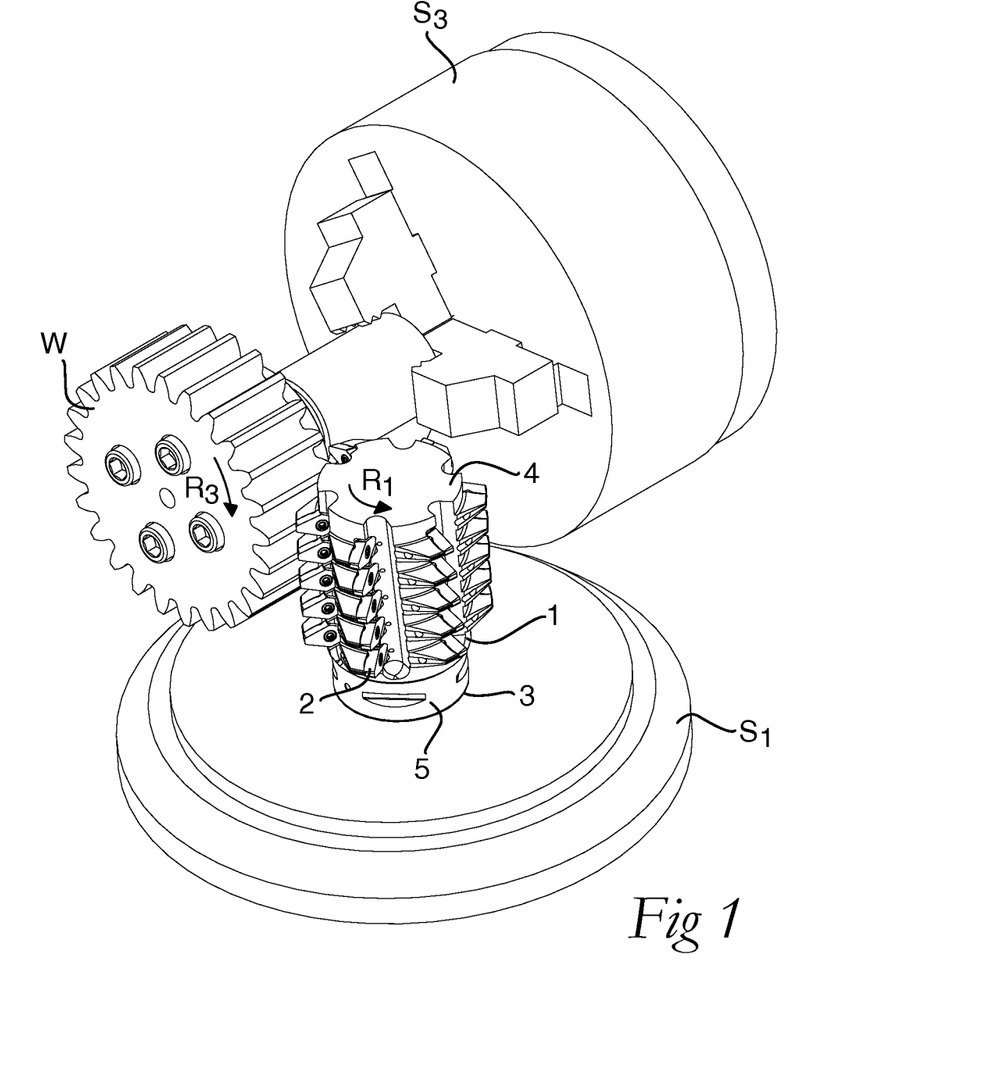
FIG. 1 schematically shows a perspective view of parts of a machine tool including a milling tool according to one exemplary embodiment.
Figure 2:
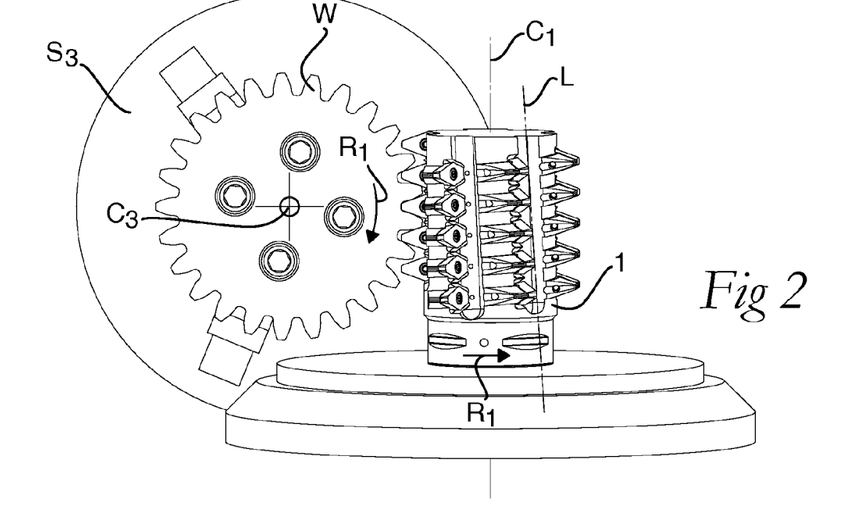
FIG. 2 shows the milling tool in FIG. 1 as seen in a side view.
Figure 3:
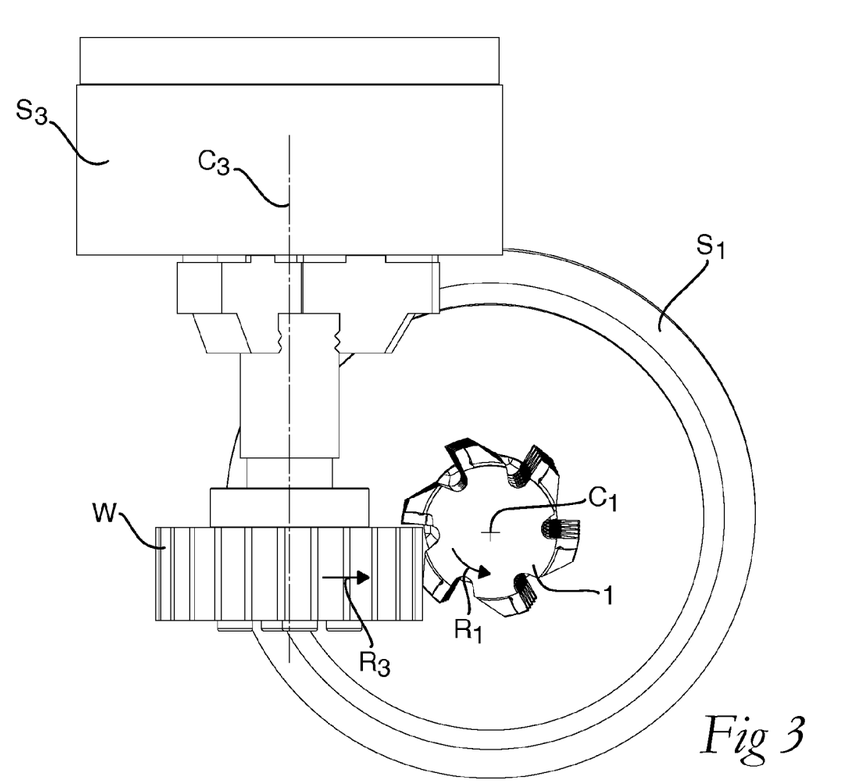
FIG. 3 shows the milling tool in FIG. 1 as seen in an end view.

As is seen in FIGS. 1-5, each recess 8 extends parallel to each a row of milling inserts 2 and seats 9. Each recess 8 borders on the respective row in such a way that each recess 8 forms a chip-receiving space at the chip surface 24 of the milling inserts 2 of such a row, which is seen in FIGS. 1 and 3.

Each row of milling inserts 2, and seats 9, extends along a respective line L, see FIGS. 2 and 5, that is perpendicular to the tangent of the helix line x. The distance between adjacent rows of seats 9 and milling inserts 2 is equidistant, i.e., this distance is equal for each pair of rows. Furthermore, the distance between adjacent milling inserts 2 along the helix line x is also equidistant, i.e., also this distance is equal for each pair of adjacent milling inserts 2.

Figure 8:
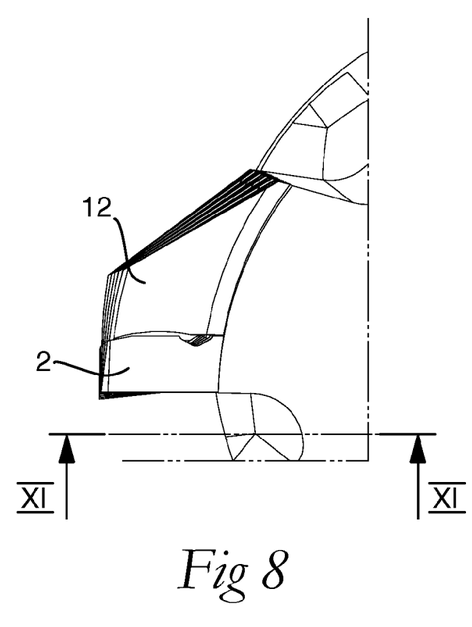
FIG. 8 shows an end view of a part of the milling tool in FIG. 1.
Figure 9:
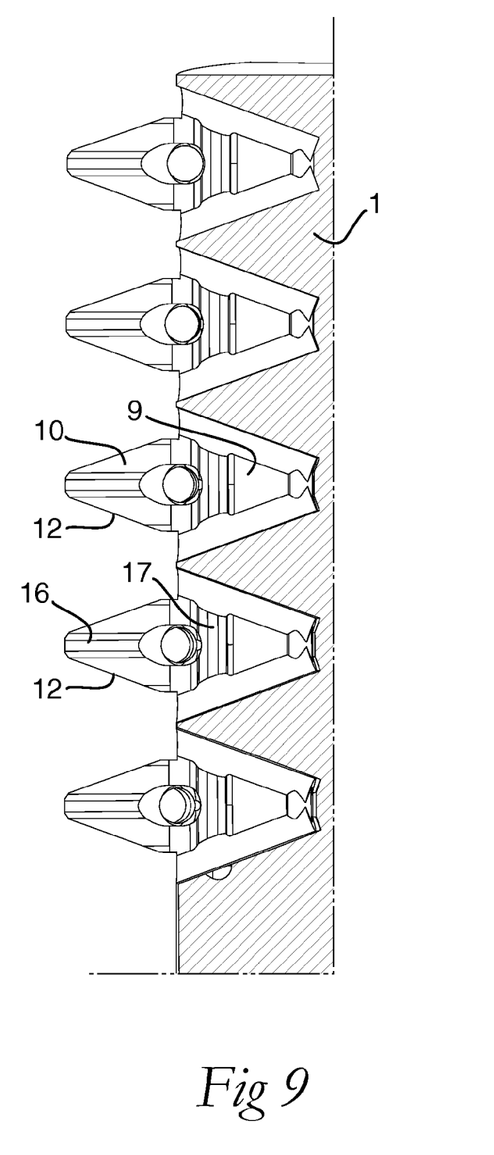
FIG. 9 shows a section view along the line IX-IX in FIG. 8.
Figure 10:
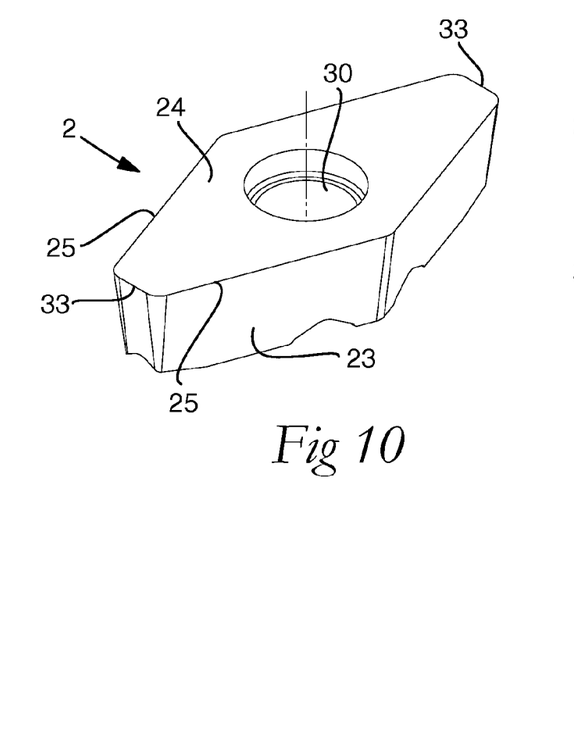
FIG. 10 shows a perspective view of a milling insert of the milling tool in FIG. 1.
Figure 11:
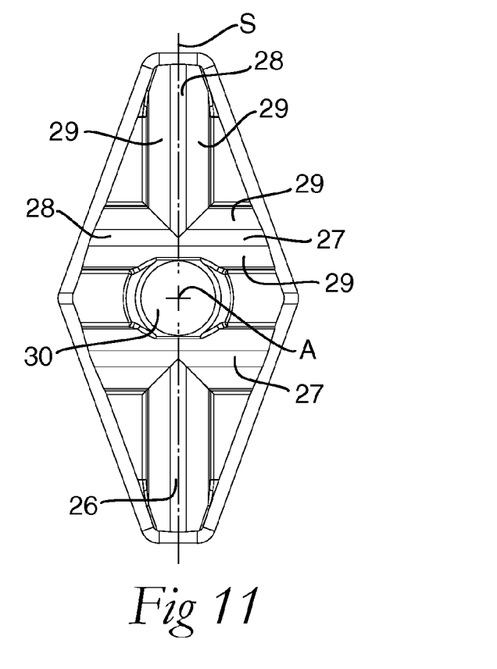
FIG. 11 shows a view from below of the milling insert in FIG. 10.
Figure 12:
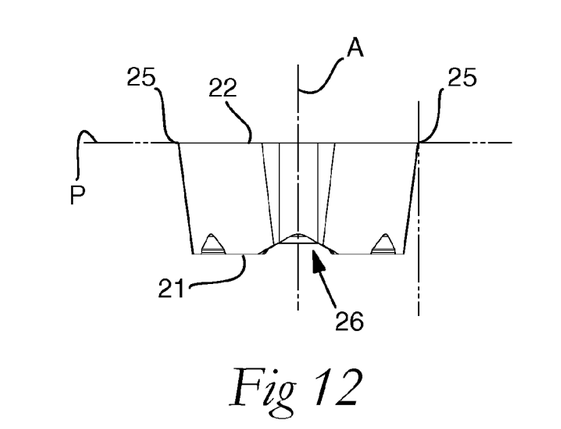
FIG. 12 shows a view from the front of the milling insert in FIG. 10.
Figure 13:
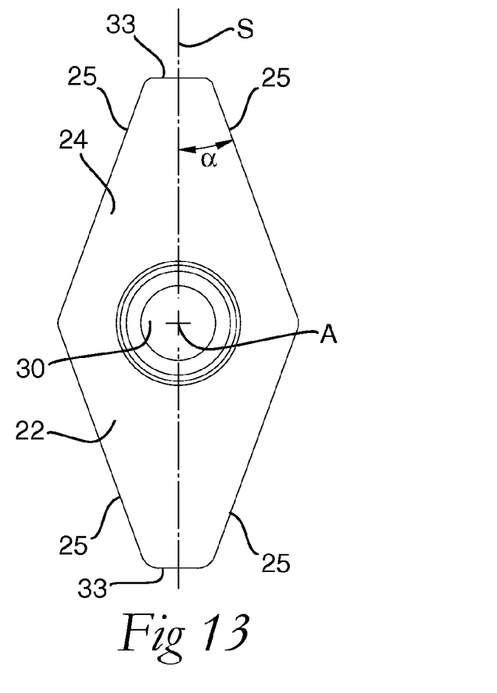
FIG. 13 shows a view from above of the milling insert in FIG. 10.

The chip surface 24 extension plane p of each milling insert 2 of the milling tool has a normal that is parallel to the tangent of the helix line x where the same intersects the extension plane p. This means that the chip surface 24 extension planes p of adjacent pairs of milling inserts 2 of the same row form an angle with each other, which is seen in FIG. 8. In order to, by this geometry, guarantee a sufficient clearance in the cutting machining, the milling inserts 2 are formed with a positive cutting geometry. This means that the chip surface 24 extension plane p forms an acute angle with the edge side 23 at least in the vicinity of the main cutting edges 25, see FIG. 12.

Figures 14, 15:
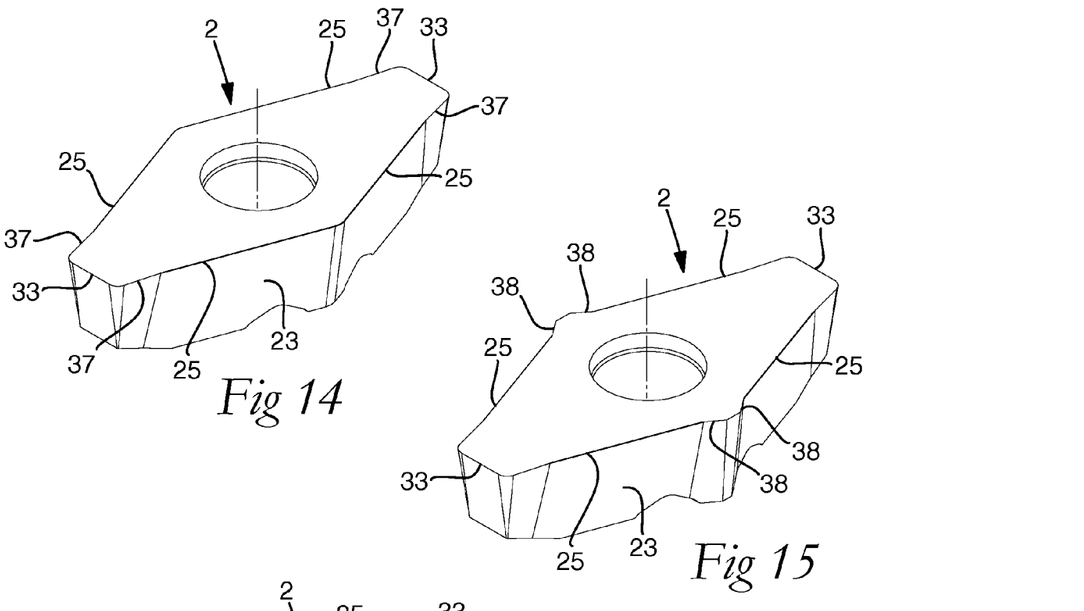
FIG. 14 shows a perspective view of first variant of the milling insert in FIG. 10.
FIG. 15 shows a perspective view of a second variant of the milling insert in FIG. 10.

The milling insert 2 shown in FIG. 14 differs from the one shown in FIGS. 10-13 in that it is formed for so-called protuberance cutting. This means that the main cutting edges 25 comprise each a deflection 37 in the vicinity of the respective end cutting edge 33. This deflection 37 allows a deeper or wider cutout in the vicinity of the bottom surface of the gash of the workpiece W.

The milling insert 2 shown in FIG. 15 differs from the one shown in FIG. 14 in that it also is formed for so-called edge chamfer involute cutting. This means that the main cutting edges 25 comprise each a deflection 38 in the vicinity of the transition to the adjacent main cutting edge 25 of the second pair of main cutting edges 25.

Figures 16, 17:
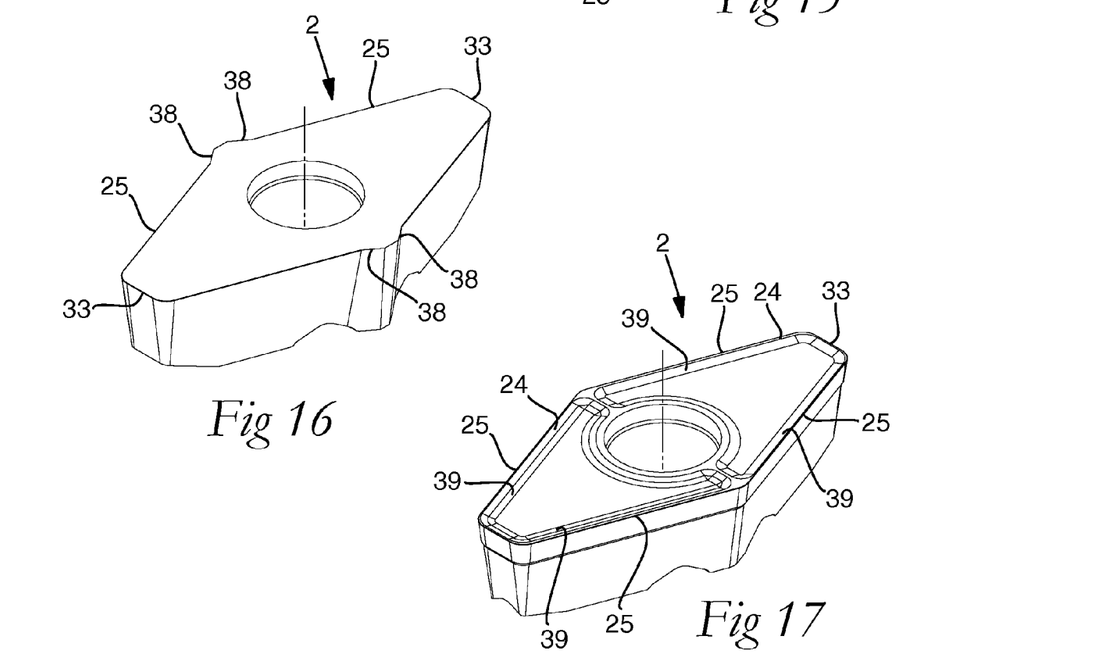
FIG. 16 shows a perspective view of a third variant of the milling insert in FIG. 10.
FIG. 17 shows a perspective view of a fourth variant of the milling insert in FIG. 10.

The milling insert 2 shown in FIG. 16 differs from the one shown in FIG. 15 only in that it lacks deflections for protuberance cutting.

The milling insert 2 shown in FIG. 17 differs from the one shown in FIGS. 10-13 in that it is formed with chip breaking means on the upper side. In the shown variant, these chip breaking means comprise a downward flank 39 that extends inward and downward from the flat or essentially flat chip surface 24 that borders on the main cutting edges 25 and the end cutting edges 33.

The invention is not limited to the embodiments described above but may be varied and modified within the scope of the subsequent claims. For instance, the milling tool may also be fixed at the outer end 4. In doing so, the milling tool may comprise a through axial hole for the receipt of a fastening rod, for instance in accordance with DIN 138. Furthermore, one or more of the seats 9 may be, or be formed of, replaceable insets or cassettes. The support surface 10 may also be formed on, or be formed of, a replaceable shim plate. Furthermore, the milling inserts 2, or one or more of the milling inserts 2, may be attached in the respective seat 9 in another way than by the shown fixing screw, for instance by a clamping member that presses against the upper side 22 of the milling insert 2. It should also be noted that the milling insert 2 does not need to be indexable. It is possible to provide the milling insert 2 with the first pair of main cutting edges 25 and dispense with the second pair of main cutting edges 25. The part of the milling insert 2 that faces away from the first pair of main cutting edges 25 can then have an arbitrary shape and, for instance, be provided with a rear abutment surface that is abutting against the seat in the milling tool and guarantees the radial position of the milling insert 2 in respect of the rotation axis C1 of the milling tool. In this embodiment, the placement of the possible fastening hole 30 can be arbitrary. For instance, the fastening hole may be placed nearer the end cutting edge 33 than for a milling insert that is indexable.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A milling tool formed for the hobbing of a workpiece having cogs, the milling tool comprising:
   a tool body that defines a rotation axis (C1) and has a fixing end, an opposite outer end, and a peripheral surface that extends around the rotation axis (C1) between the fixing end and the outer end, the tool body comprising a large number of separated seats that are arranged at the peripheral surface one after the other along a helix line (x) having a constant pitch; and
   a corresponding plurality of replaceable milling inserts mounted in the seats of the tool body, each insert comprising an under side, an opposite upper side that forms a chip surface, a circumferential edge side that connects the upper side and the under side, a centre axis (A) that extends through the under side and the upper side, a symmetry line (S) that is perpendicular to the centre axis (A), as well as at least one pair of main cutting edges that are symmetrical in respect of the symmetry line (S) and formed where the edge side meets the chip surface, the chip surface extending in an extension plane (p) that comprises the main cutting edges of said pairs of main cutting edges, and each seat being formed to receive one of said milling inserts and comprising a support surface that is arranged to allow support to the milling insert that projects from the tool body for cutting engagement with a gash of said workpiece (W),
   wherein the chip surface extension plane (p) of each milling insert has a normal that is parallel to the tangent of the helix line (x) where the same intersects the extension plane,
   wherein the milling inserts are arranged in a plurality of rows,
   wherein each row comprises at least two milling inserts and extends along a respective line (L) that is perpendicular to the tangent of the helix line (x), and
   wherein the chip surface extension planes (p) of adjacent pairs of milling inserts of the same row form an angle with each other.

2. The milling tool according to claim 1, wherein the distance between adjacent milling inserts along the helix line (x) is equal for each pair of adjacent milling inserts.

3. The milling tool according to claim 1, wherein the tool body comprises elongate recesses in the peripheral surface, which extend parallel to and border on a respective one of said rows in such a way that each recess forms a chip-receiving space at the chip surface of the milling inserts of such a row.

4. The milling tool according to claim 1, wherein the chip surface extension plane (p) forms an acute angle with the edge side at least in the vicinity of the main cutting edges so that the milling insert obtains a positive cutting geometry.

5. The milling tool according to claim 1, wherein each seat comprises a pocket that extends inward from the peripheral surface.

6. The milling tool according to claim 5, wherein each seat also comprises a protuberance that projects from the peripheral surface.

7. The milling tool according to claim 5, wherein each pocket is limited by the support surface and an inner limiting wall formed in such a way that there is a gap between the limiting wall and the milling insert.

8. The milling tool according to claim 1, wherein the support surface of each seat comprises a projection that extends from the support surface and that is in engagement with a corresponding recess of the under side of the milling insert in such a way that the position of the milling insert is guaranteed.

9. The milling tool according to claim 8, wherein the projection comprises a first elongate ridge having a primarily radial extension, and a second elongate ridge having a primarily axial extension.

10. The milling tool according to claim 1, wherein the milling insert comprises a fastening hole that extends through the upper side and the under side, and wherein the milling insert is fastened in the seat by means of a fixing screw that extends through the fastening hole into a threaded hole extending through the support surface.

11. The milling tool according to claim 1, wherein the under side of the milling insert extends in an extension plane parallel to the extension plane (p) of the upper side.

12. The milling tool according to claim 1, wherein the symmetry line (S) forms a pressure angle $\alpha$ with each one of the main cutting edges of said pairs of main cutting edges, and wherein the pressure angle $\alpha$ is in the interval of 18-32°.

13. The milling tool according to claim 1, wherein each milling insert comprises at least one transverse end cutting edge that extends between the main cutting edges of said pairs of main cutting edges.

14. The milling tool according to claim 1, wherein each milling insert is indexable by rotation around the centre axis (A) between two opposite insert positions and comprises two of said pairs of main cutting edges, one for each insert position.

15. The milling tool according to claim 5, wherein the pocket forms a protection for the pair of main cutting edges that faces inward toward the rotation axis (C1).

16. The milling tool according to claim 14, wherein the upper side of the milling insert has a rhombic basic shape with a relatively long diagonal line and a relatively short diagonal line perpendicular to the relatively long diagonal line.

17. A milling tool formed for the hobbing of a workpiece having cogs, the milling tool comprising:
a tool body that defines a rotation axis (C1) and has a fixing end, an opposite outer end, and a peripheral surface that extends around the rotation axis (C1) between the fixing end and the outer end, the tool body comprising a large number of separated seats that are arranged at the peripheral surface one after the other along a helix line (x) having a constant pitch; and
a corresponding plurality of replaceable milling inserts mounted in the seats of the tool body, each insert including an under side, an opposite upper side that forms a chip surface, a circumferential edge side that connects the upper side and the under side, a centre axis (A) that extends through the under side and the upper side, a symmetry line (S) that is perpendicular to the centre axis (A), as well as at least one pair of main cutting edges that are symmetrical in respect of the symmetry line (S) and formed where the edge side meets the chip surface, the chip surface extending in an extension plane (p) that comprises the main cutting edges of said pairs of main cutting edges, and each seat being formed to receive one of said milling inserts and comprising a support surface that is arranged to allow support to the milling insert that projects from the tool body for cutting engagement with a gash of said workpiece (W),
wherein the chip surface extension plane (p) of each milling insert has a normal that is parallel to the tangent of the helix line (x) where the same intersects the extension plane,
wherein the chip surface extension plane of each milling insert is inclined relative to the rotation axis (C1),
wherein, in the chip surface extension plane, the symmetry line is aligned with and contains a radius of the outer end,
wherein the milling inserts are arranged in a plurality of rows,
wherein each row comprises at least two milling inserts and extends along a respective line (L) that is perpendicular to the tangent of the helix line (x), and
wherein the chip surface extension planes (p) of adjacent pairs of milling inserts of the same row form an angle with each other.

18. The milling tool according to claim 17, wherein the chip surface extension plane is inclined relative to the rotation axis at an angle that is the same as a pitch angle of the helix line.

* * * * *